United States Patent
Dunaisky et al.

(10) Patent No.: US 10,043,234 B2
(45) Date of Patent: Aug. 7, 2018

(54) SYSTEM AND METHOD FOR FRAME BUFFER DECOMPRESSION AND/OR COMPRESSION

(71) Applicant: NVIDIA Corporation, Santa Clara, CA (US)

(72) Inventors: Jonathan Dunaisky, Fort Collins, CO (US); Steven E. Molnar, Chapel Hill, NC (US); Christian Amsinck, Cary, NC (US); Rui Bastos, Porto Alegre (BR); Eric B. Lum, San Jose, CA (US); Justin Cobb, Toney, AL (US); Emmett Kilgariff, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 47 days.

(21) Appl. No.: 13/732,286

(22) Filed: Dec. 31, 2012

(65) Prior Publication Data
US 2014/0184601 A1    Jul. 3, 2014

(51) Int. Cl.
*G06T 17/00*    (2006.01)
*G06T 1/60*    (2006.01)
(Continued)

(52) U.S. Cl.
CPC .............. *G06T 1/60* (2013.01); *G06T 9/00* (2013.01); *G09G 5/393* (2013.01); *H04N 19/428* (2014.11); *G09G 2360/122* (2013.01)

(58) Field of Classification Search
CPC ...... H04N 19/61; H04N 19/117; H04N 19/44; H04N 19/423; H04N 19/174;
(Continued)

(56) References Cited

U.S. PATENT DOCUMENTS

| | | |
|---|---|---|
| 5,032,903 A | 7/1991 | Suzuki et al. |
| 5,335,322 A | 8/1994 | Mattison |

(Continued)

FOREIGN PATENT DOCUMENTS

| | | |
|---|---|---|
| EP | 2143280 | 1/2010 |
| TW | 200820131 | 5/2008 |

OTHER PUBLICATIONS

John M. Danskin, et al., Espacenet Bibliographic Data: TW200820131, Abstract of TW200820131, May 1, 2008, p. 1, Taiwan.

*Primary Examiner* — Xilin Guo

(57) ABSTRACT

A system and method for decompressing compressed data (e.g., in a frame buffer) and optionally recompressing the data. The method includes determining a portion of an image to be accessed from a memory and sending a conditional read corresponding to the portion of the image. In response to the conditional read, an indicator operable to indicate that the portion of the image is uncompressed may be received. If the portion of the image is compressed, in response to the conditional read, compressed data corresponding to the portion of the image is received. In response to receiving the compressed data, the compressed data is uncompressed into uncompressed data. The uncompressed data may then be written to the memory corresponding to the portion of the image. The uncompressed data may then be in-place compressed for or during subsequent processing.

20 Claims, 7 Drawing Sheets

(51) Int. Cl.
*G06T 9/00* (2006.01)
*G09G 5/393* (2006.01)
*H04N 19/426* (2014.01)

(58) Field of Classification Search
CPC .... H04N 19/172; H04N 1/41; G09G 2340/02; G09G 2370/10; G06F 3/0608; G06F 3/064; G06F 3/0661; G06F 3/0673; G06F 2212/401; G06F 3/0659; G06F 3/0638; G06F 12/0871; G06F 17/30902; G06F 3/0643; G06T 2207/10016; G06T 9/00; H04L 69/04; H04L 47/30
See application file for complete search history.

(56) References Cited

U.S. PATENT DOCUMENTS

| | | | |
|---|---|---|---|
| 5,392,396 A | 2/1995 | Macinnis | |
| 5,748,904 A | 5/1998 | Huang et al. | |
| 5,990,904 A | 11/1999 | Griffin | |
| 6,128,000 A | 10/2000 | Jouppi et al. | |
| 6,490,058 B1 | 12/2002 | Takabatake et al. | |
| 6,664,961 B2 | 12/2003 | Ray et al. | |
| 6,683,979 B1 | 1/2004 | Walker et al. | |
| 6,704,026 B2 | 3/2004 | Kurihara et al. | |
| 6,825,847 B1* | 11/2004 | Molnar | G09G 5/02 345/555 |
| 7,064,771 B1 | 6/2006 | Jouppi et al. | |
| 7,075,681 B1 | 7/2006 | Brothers | |
| 7,403,212 B2 | 7/2008 | Schick et al. | |
| 7,479,965 B1 | 1/2009 | King et al. | |
| 7,692,659 B1 | 4/2010 | Molnar et al. | |
| 8,031,977 B2 | 10/2011 | Min et al. | |
| 8,116,579 B2 | 2/2012 | Fenney et al. | |
| 8,605,104 B1 | 12/2013 | McAllister et al. | |
| 8,660,347 B2 | 2/2014 | Tamura | |
| 8,670,613 B2 | 3/2014 | McAllister et al. | |
| 2001/0038642 A1* | 11/2001 | Alvarez, II | H03M 7/30 370/477 |
| 2002/0114461 A1 | 8/2002 | Shimada | |
| 2003/0020741 A1 | 1/2003 | Boland | |
| 2003/0201994 A1 | 10/2003 | Taylor | |
| 2004/0086177 A1 | 5/2004 | Zhang et al. | |
| 2005/0213128 A1 | 9/2005 | Imai et al. | |
| 2006/0170703 A1 | 8/2006 | Liao | |
| 2007/0268298 A1 | 11/2007 | Alben et al. | |
| 2008/0247641 A1* | 10/2008 | Rasmusson | G06T 11/40 382/166 |
| 2009/0033669 A1* | 2/2009 | Hochmuth | G09G 5/006 345/520 |
| 2009/0080531 A1 | 3/2009 | Hashiguchi et al. | |
| 2009/0295816 A1 | 12/2009 | Kallio | |
| 2010/0060629 A1 | 3/2010 | Rasmusson et al. | |
| 2011/0243469 A1* | 10/2011 | McAllister | G06T 9/00 382/239 |
| 2012/0050303 A1 | 3/2012 | McAllister et al. | |
| 2012/0113787 A1 | 5/2012 | Komma et al. | |
| 2012/0183215 A1 | 7/2012 | Van Hook et al. | |
| 2013/0021352 A1* | 1/2013 | Wyatt et al. | 345/520 |
| 2013/0290281 A1* | 10/2013 | Yokoi et al. | 707/693 |
| 2014/0184612 A1 | 7/2014 | Dunaisky et al. | |
| 2014/0184627 A1 | 7/2014 | Dunaisky et al. | |

* cited by examiner

SYSTEM AND METHOD FOR FRAME BUFFER DECOMPRESSION AND/OR COMPRESSION

FIELD OF THE INVENTION

Embodiments of the present invention are generally related to memory and graphics processing units (GPUs).

BACKGROUND OF THE INVENTION

As computer systems have advanced, graphics processing units (GPUs) have become increasingly advanced both in complexity and computing power. GPUs are thus used to handle processing of increasingly large and complex graphics. Some GPUs use frame buffer compression to reduce communication bandwidth requirements to the frame buffer memory hierarchy thereby increasing performance. Not all of the frame buffer may be compressed even with GPUs that implement frame buffer compression.

Unfortunately, system components or clients which are not compression aware may need to access the frame buffer directly. In order for those clients to be able to access the frame buffer, the frame buffer needs to be decompressed. One conventional solution involves tracking which areas of the frame buffer will be accessed by non-compression aware clients and allocating uncompressed memory to the areas of the frame buffer. As a result of not using compression, this conventional solution loses the high speed benefits of frame buffer compression.

Another conventional solution involves copying the compressed data and writing it in an uncompressed form. This conventional solution requires a read and write for every pixel in the frame buffer regardless of whether it was compressed thereby wasting power and time on reading uncompressed data. Each read of uncompressed data is especially costly from a performance perspective.

SUMMARY OF THE INVENTION

Accordingly, what is needed is a solution to allow use of compression when rendering while having the frame buffer accessible by clients that are not compression aware. Embodiments of the present invention are operable to perform in-place high performance expansion or decompression using conditional reads thereby reading and uncompressing compressed data (e.g., tiles of an image in a frame buffer) while not reading uncompressed data. The in-place expansion allows use of previously allocated memory thereby advantageously avoiding need for additional memory allocation. For example, an embodiment of the present invention makes a sweep over the surface (e.g., image in the frame buffer) with conditional reads, e.g., reads that only return data if the portion of memory was compressed. In other words, embodiments of the present invention advantageously conserve bandwidth as each compressed tile (or other portion of the frame buffer) is processed while uncompressed tiles are not read. Embodiments of the present invention thereby provide a lower-power and faster alternative to conventional solutions. The end result of the in-place decompression process is a space of memory that looks as if it was written without compression having been enabled where the process accesses the pieces of memory that were originally compressed without accessing uncompressed data or data outside of the space of memory. In one embodiment, in-place decompression may be performed in conjunction with a clear mechanism operable for clearing a screen. Embodiments of the present invention are further operable to decompress as much data as possible in a single operation.

In one embodiment, the present invention is directed to a method for decompressing compressed data (e.g., in a frame buffer). The method includes determining a portion of an image (e.g., a tile or three dimensional volume) to be accessed from a memory (e.g., a frame buffer) and performing a conditional read corresponding to the portion of the image. In one embodiment, the frame buffer is operable for access by a component unable to process the compressed data. In response to the conditional read, an indicator (e.g., token or single bit) operable to indicate that the portion of the image is uncompressed may be received. In one embodiment, the conditional read is sent to a cache. If the portion of the image is compressed, in response to the conditional read, compressed data corresponding to the portion of the image is received. In response to receiving the compressed data, the compressed data is uncompressed into uncompressed data. The uncompressed data may then be written to the memory corresponding to the portion of the image. In one exemplary embodiment, the method may further include generating a tile descriptor corresponding to the portion of the image and determining a memory address corresponding to the portion of the image. The uncompressed data may then be in-place compressed for or during subsequent processing.

In one embodiment, the present invention is directed toward a system for accessing a frame buffer. The system includes a raster module operable to select a tile of the frame buffer to be accessed and a conditional read module operable to determine whether the tile of the frame buffer comprises at least one of compressed data and uncompressed data. The compressed data may have been compressed by a graphics processing unit (GPU) (e.g., during rendering). In one embodiment, the raster module is operable to select the tile of the frame buffer based on traversing a portion of the frame buffer (e.g., in raster scan order). In one exemplary embodiment, the raster module is operable to select a sub-portion of the frame buffer (e.g., in raster scan order) and operable to determine an address of the frame buffer corresponding to the tile. The conditional read module is further operable to return compressed data if the tile comprises compressed data. In one exemplary embodiment, the conditional read module is operable to return a token indicating that the tile is uncompressed if the tile comprises uncompressed data. The system further includes a decompression module operable to output uncompressed data corresponding to the compressed data and a data storage module operable to write the uncompressed data to a portion of the frame buffer corresponding to the tile of the frame buffer (e.g., in an in-place manner).

In another embodiment, the present invention is implemented as a graphics processing unit (GPU). The GPU includes a frame buffer operable to store compressed data and a raster module operable to select a portion of the frame buffer to be assessed. The raster module may be operable to select the portion of the frame buffer (e.g., the or 3D volume) based on a raster order traversal of a portion of the frame buffer. In one embodiment, the compressed data is operable for use in rendering. The GPU further includes a conditional read module operable to determine whether the portion of the frame buffer is a compressed portion of an image and a decompression module operable to decompress the compressed portion. In one embodiment, the decompression module is operable to decompress the portion of the frame buffer in an in-place manner. The conditional read module may be operable to return compressed data corresponding to the compressed portion of the image. In one exemplary embodiment, the conditional read module is operable to return a token if the portion of the frame buffer is an uncompressed tile. In one embodiment, a cache comprises the conditional read module.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Figure 1:
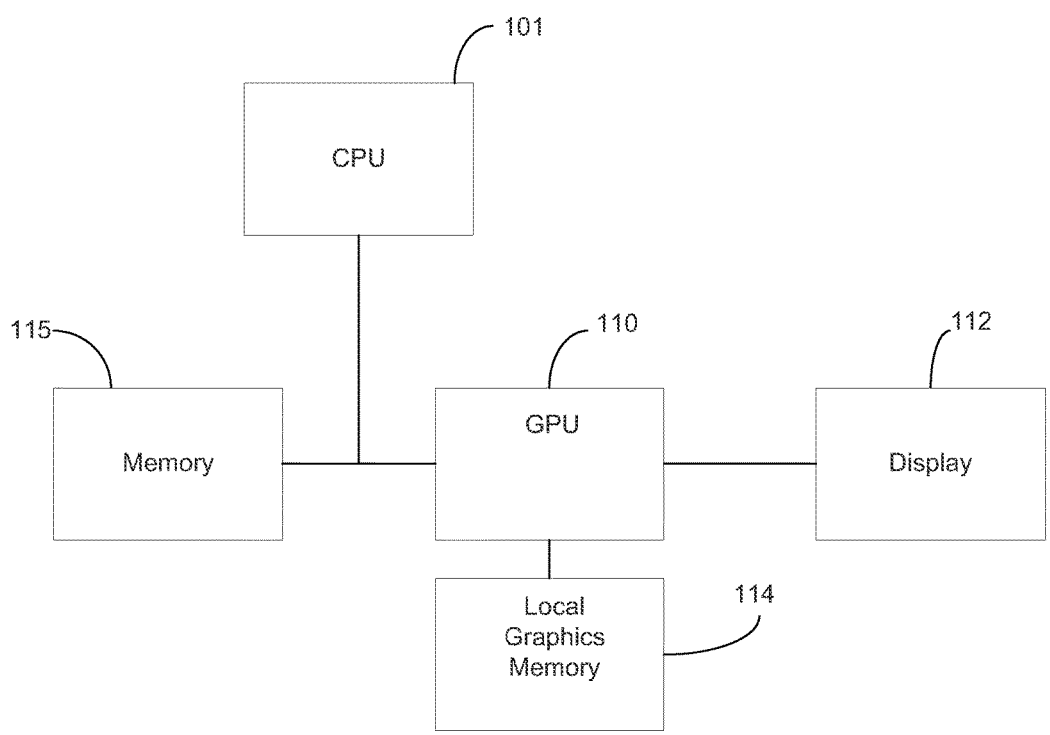
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of an integrated circuit (e.g., computing system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Environment

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 may be coupled to a display 112. One or more additional GPUs can optionally be coupled to system 100 to further increase its computational power. The GPU(s) 110 is coupled to the CPU 101 and the system memory 115. The GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

The CPU 101 and the GPU 110 can also be integrated into a single integrated circuit die and the CPU and GPU may share various resources, such as instruction logic, buffers, functional units and so on, or separate resources may be provided for graphics and general-purpose operations. The GPU may further be integrated into a core logic component. Accordingly, any or all the circuits and/or functionality described herein as being associated with the GPU 110 can also be implemented in, and performed by, a suitably equipped CPU 101. Additionally, while embodiments herein may make reference to a GPU, it should be noted that the described circuits and/or functionality can also be implemented with other types of processors (e.g., general purpose or other special-purpose coprocessors) or within a CPU.

System 100 can be implemented as, for example, a desktop computer system or server computer system having a powerful general-purpose CPU 101 coupled to a dedicated graphics rendering GPU 110. In such an embodiment, components can be included that add peripheral buses, specialized audio/video components, IO devices, and the like. Similarly, system 100 can be implemented as a handheld device (e.g., cellphone, etc.), direct broadcast satellite (DBS)/terrestrial set-top box or a set-top video game console device such as, for example, the Xbox®, available from Microsoft Corporation of Redmond, Wash., or the PlayStation3®, available from Sony Computer Entertainment Corporation of Tokyo, Japan. System 100 can also be implemented as a "system on a chip", where the electronics (e.g., the components 101, 115, 110, 114, and the like) of a computing device are wholly contained within a single integrated circuit die. Examples include a hand-held instrument with a display, a car navigation system, a portable entertainment system, and the like.

Exemplary Systems and Methods for Frame Buffer Decompression

Embodiments of the present invention are operable to perform in-place high performance expansion or decompression using conditional reads thereby reading and uncompressing compressed data (e.g., 1D arrays, 2D tiles, 3D volumes or bricks of data, and 4D arrays of moving volumes of an image in a frame buffer) while not reading uncompressed data. The in-place expansion allows use of previously allocated memory thereby advantageously avoiding need for additional memory allocation. For example, an embodiment of the present invention makes a sweep over the surface (e.g., image in the frame buffer) with conditional reads, e.g., reads that only return data if the portion of memory was compressed. In other words, embodiments of the present invention advantageously conserve bandwidth as each compressed tile (or other portion of the frame buffer) is processed while uncompressed tiles are not read. Embodiments of the present invention thereby provide a lower-power and faster alternative to conventional solutions. In one embodiment, in-place decompression may be performed in conjunction with a clear mechanism operable for clearing a screen. Embodiments of the present invention are further operable to decompress as much data as possible in a single operation.

Figure 2:
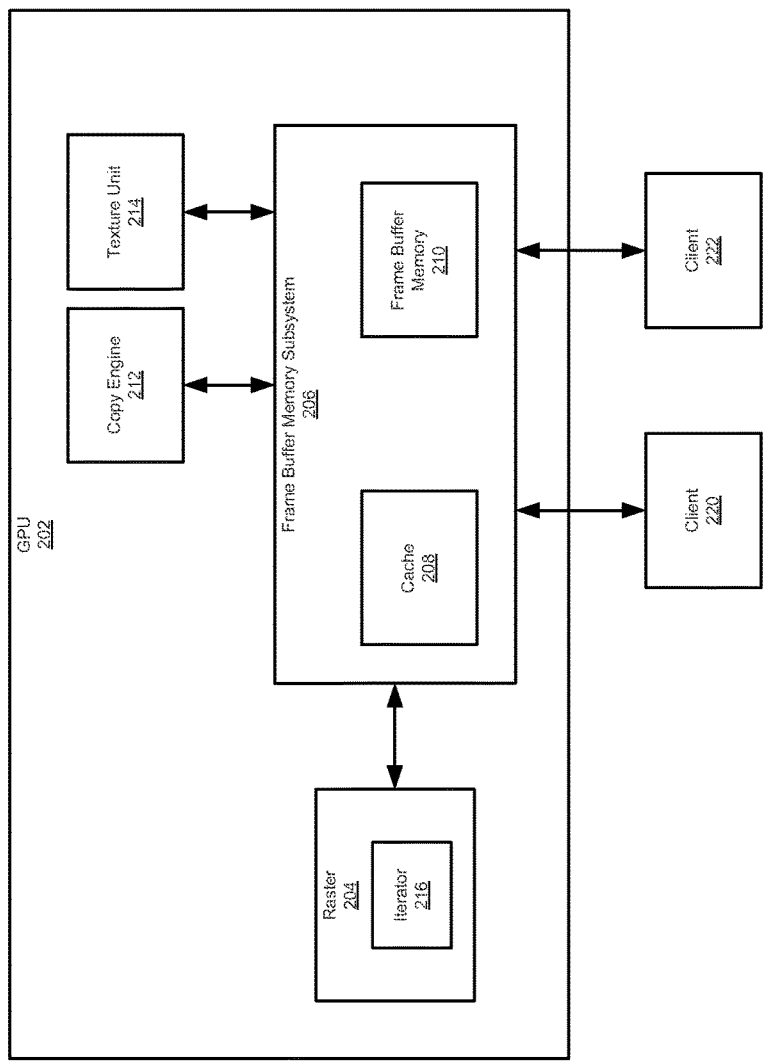
FIG. 2 shows a block diagram of exemplary components of a graphics processing unit (GPU) in accordance with one embodiment of the present invention.
Figure 3:
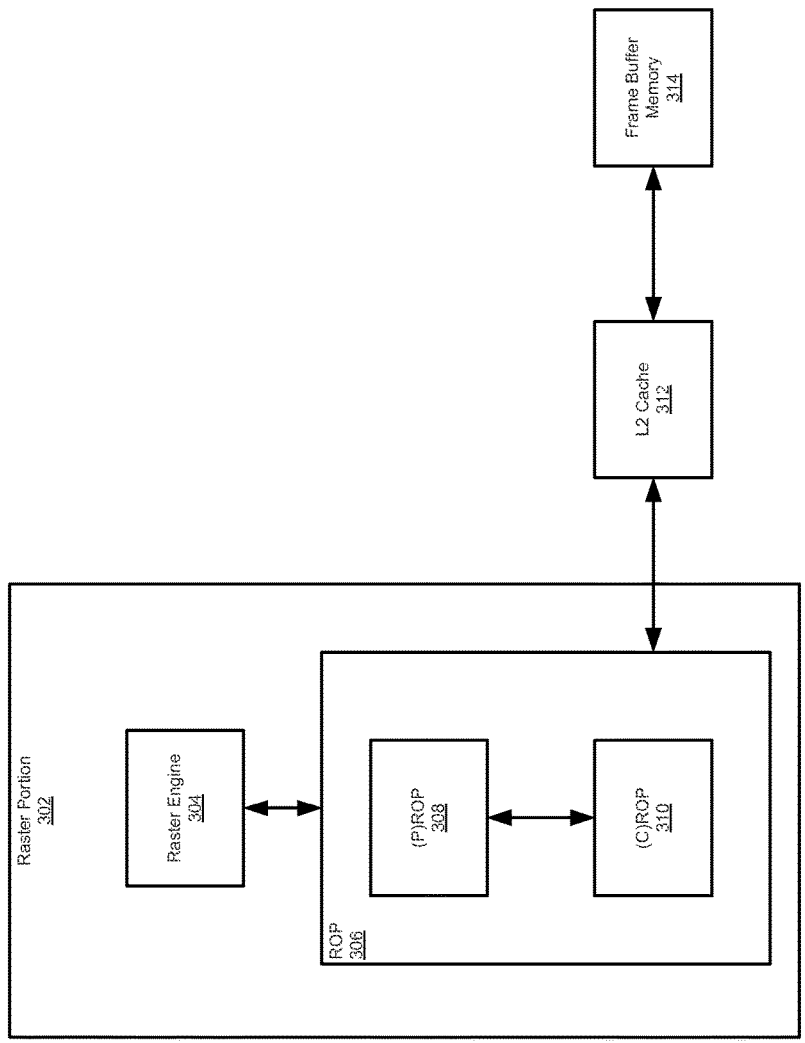
FIG. 3 shows an exemplary data flow diagram in accordance with one embodiment of the present invention for in-place decompression and expansion.

FIGS. 2-3 illustrate example components used by various embodiments of the present invention. Although specific components are disclosed in circuits 200 and 300, it should be appreciated that such components are examples. That is, embodiments of the present invention are well suited to having various other components or variations of the components recited in systems 200 and 300. It is appreciated that the components in systems 200 and 300 may operate with other components than those presented, and that not all of the components of systems 200 and 300 may be required to achieve the goals of systems 200 and 300.

FIG. 2 shows a block diagram of exemplary components of an exemplary operating environment in accordance with one embodiment of the present invention. Exemplary operating environment 200 includes graphics processing unit (GPU) 202 and clients 220-222. FIG. 2 depicts an exemplary operating environment and exemplary components that may be involved in performing decompression of a frame buffer.

Exemplary GPU 202 includes raster portion 204, frame buffer memory subsystem 206, copy engine 212, and texture unit 214. The components shown in FIG. 2 of exemplary GPU 202 are exemplary and it is appreciated that a GPU may have more or less components than those shown. In one embodiment, GPU 202 may be part of a System on a Chip (SoC). In another embodiment, GPU 202 may be part of a CPU. GPU 202 may be configured to support compressed frame buffers (e.g., of frame buffer memory subsystem 206) and thereby portions of an image (e.g., 1D arrays, 2D tiles, 3D volumes or bricks of data, and 4D arrays of moving volumes) may be opportunistically compressed. The opportunistic compression thereby enhances performance while saving power and bandwidth.

In one embodiment, GPU 202 may include a hardware decompressor (not shown) which may be used by various components of GPU 202 for decompression operations. In another embodiment, cache 208 may include a decompressor (not shown) operable to decompress data in cache 208 for other components. In one exemplary embodiment, cache 208 may have a shared decompressor accessible by components of GPU 202 (e.g., copy engine 212 or texture unit 214). In one embodiment, texture unit 214 is operable to handle compressed data via a compressor and decompressor built into texture unit 214.

Clients 220-222 are operable to access frame buffer memory subsystem 206. Clients 220-222 may be a variety of devices or components including a CPU, a display, block image transfer (blit) engine, software based algorithm executing outside of the GPU, another GPU (e.g., a GPU not aware of the compression), etc. Clients 220-222 may further not be able to understand compression or compression techniques that were used to process and store data into frame buffer memory subsystem 206 during rendering by GPU 202. Clients 220-222 may thus need data frame buffer memory subsystem to be decompressed prior to clients 220-222 accessing the data. Clients 220-222 may access frame buffer memory 210 (e.g., directly) and thus not be able to use a decompressor built into cache 208 or a shared decompressor of GPU 202.

In one exemplary embodiment, frame buffer memory subsystem 206 includes cache 208 and frame buffer memory 210. In one embodiment, cache 208 includes a data structure comprising a list of portions of an image (e.g., 1D arrays, 2D tiles, 3D volumes or bricks of data, and 4D arrays of moving volumes) stored in frame buffer memory 210 and an indicator of whether each portion of the image is compressed or uncompressed. Cache 208 may cache portions (e.g., tiles) of an image stored in frame buffer memory 210. In one embodiment, frame buffer memory 210 is operable for use as storage during rendering operations by GPU 202 (e.g., including intermediate and finalized values) and may store data compressed by GPU 202 or a portion of GPU 202.

Raster portion 204 is operable to perform raster operations including rasterization (e.g., determining a graphics primitive's contribution to a pixel) of an image during rendering by GPU 202. In one embodiment, raster portion 204 is operable to perform operations related to rendering using compressed data (e.g., 1D arrays, 2D tiles, 3D volumes or bricks of data, and 4D arrays of moving volumes). Raster portion 204 may comprise an iterater 216 operable to visit each tile (e.g., or other portion of an image for a screen) and used for clearing of the screen. In one embodiment, raster portion 204 may be operable to rapidly visit each tile (or other portion) of a screen image stored in frame buffer memory 210 (e.g., rapidly scan an image at different tiles sizes). Iterater 216 may further be operable to identify which tiles (or other portions of the frame buffer) are stored in a compressed manner in frame buffer memory 210 (and/or cache 208).

In-place decompression/expansion is now explained. In one embodiment, raster portion 204 is operable to perform a scan of portions of an image (e.g., 1D arrays, 2D tiles, 3D volumes or bricks of data, and 4D arrays of moving volumes) in frame buffer memory subsystem 206 and selectively decompress compressed portions of an image without reading portions of an image that are uncompressed. For example, raster portion 204 may query whether a tile is compressed and if the tile is compressed, decompress the compressed tile in frame buffer memory 210. This may be based on a data structure (e.g., in cache 208) indicating which portions of the image are compressed and decompressed. For compressed 3D volumes, a 3D brick of data is uncompressed. As another example, raster portion 204 may skip over uncompressed tiles while reading the compressed tiles, uncompressing the compressed tiles, and written writing them back to frame buffer memory 210. It is noted that bandwidth is not used for uncompressed tiles (or other portions of the frame buffer) as the uncompressed tiles (or other portions of the frame buffer) are not read. In one embodiment, raster portion 204 is operable to uncompress the compressed data in-place (e.g., as in FIG. 4) and thereby avoid copying the data to a different portion of frame buffer memory 210.

FIG. 3 shows an exemplary data flow diagram in accordance with one embodiment of the present invention for in-place decompression/expansion. Exemplary data flow diagram 300 includes raster portion 302, L2 cache 314, and frame buffer memory 314. FIG. 3 depicts an exemplary flow of data and associated communications (e.g., requests) in the uncompressing of compressed data in a frame buffer.

Generally, in one embodiment, a sweep over a surface (e.g., an image to be output to a display) in the frame buffer is made with conditional reads (e.g., reads that only return data if the corresponding portion of the memory was compressed). For example, the compressed data of a tile of a surface is returned by a conditional read and then written in expanded or uncompressed form. The uncompressed data or tiles of the surface are not read or written. In one embodiment, the sweep of a conditional read can be performed quickly for buffers that are mostly uncompressed and read and write operations are done only for the compressed tiles. In one embodiment, a fastclear mechanism of the GPU is used in conjunction with in-place decompression to decompress much as data as possible in a single operation. By using the fastclear mechanism, embodiments of the present invention facilitate sweeping over the entire surface exactly once.

Raster portion 302 includes raster engine 304 and raster operation portion 306. Raster engine 304 is operable to scan image in raster order and perform rasterization during rendering of a scene (e.g., by GPU 202).

In one embodiment, ROP 306 is operable to perform writing of data for raster portion 302. ROP 306 may visit the same pixel more than once during rendering due to drawing a pixel (e.g., based on a first graphics primitive) and then update the pixel again (e.g., based on a second graphics primitive). In one exemplary embodiment, ROP 306 is operable to provide fast access to color and depth buffers during rendering. ROP 306 may be a hardware unit of a graphics processor unit (GPU) (e.g., GPU 202). In one exemplary embodiment, raster engine 304 generates tile descriptors based on each tile traversed and sends the tile descriptors to ROP 306. ROP 306 may receive tile descriptors with commands to clear the tile from raster engine 304. Raster engine 304 may include a mechanism for fast traversals of each tile of a screen image. In one embodiment, ROP 306 is operable to process a clear tile command and send the tile information to L2 cache 312 in one clock cycle thereby allowing the tile to be cleared in one cycle. A conditional read command may be used by ROP 306 to determine whether a tile comprises uncompressed or compressed data. ROP 306 may thus use a conditional read command to determine whether to read a tile based on whether the tile is compressed or uncompressed.

In one embodiment, upon receiving a clear tile command from raster engine 304, ROP 306 issues a conditional read for the tile to L2 cache 312. In response, L2 cache 312 returns compressed data if the tile is uncompressed or acknowledges the conditional read command (e.g., without performing a read of the uncompressed tile data). ROP 306 may then uncompress the compressed data received from L2 cache 312 and write the uncompressed data to frame buffer memory 314. In one embodiment, ROP 306 writes the uncompressed data to frame buffer 314 via L2 cache 312. The uncompressed data written to frame buffer memory 314 by ROP 306 can then be accessed by a system component (e.g., clients 220-222) that is not able to process compressed data.

In one embodiment, ROP 306 includes Pre-Raster Operation (PROP) 308, and Color-Raster Operation (CROP) 310. Raster engine 304 is operable to send a tile descriptor to PROP 306 (e.g., as x and y coordinates). PROP 306 is operable to convert the tile descriptors to an address (e.g., memory address) where the tile corresponding to the tile descriptor is stored (e.g., in frame buffer 314). CROP 310 receives the address of the tile from PROP 308 and CROP 310 issues a conditional read command comprising the address of the tile to L2 cache 312.

L2 cache 312 and frame buffer memory 314 may be part of a frame buffer memory subsystem (e.g., frame buffer memory subsystem 206). L2 cache 312 may include a data structure with a data structure (e.g., one or two bits) that indicates the compression status of each tile (e.g., or 1D arrays, 2D tiles, 3D volumes or bricks of data, and 4D arrays of moving volumes) stored in frame buffer memory 314. L2 cache 312 may thus receive a conditional command comprising an address of a tile (e.g., or 1D arrays, 2D tiles, 3D volumes or bricks of data, and 4D arrays of moving volumes) and access the data structure to determine whether a tile (e.g., or 1D arrays, 2D tiles, 3D volumes or bricks of data, and 4D arrays of moving volumes) is compressed or uncompressed. When data structure indicates that the tile is compressed, L2 cache 312 returns the compressed data of the tile (e.g., from L2 cache 312 or frame buffer memory 314). When the data structure indicates that the tile is uncompressed, L2 cache 312 may acknowledge the read or return an indicator (e.g., token or single bit) indicating that the tile is uncompressed. In one embodiment, the data structure indicating the compression status of each tile is also stored in frame buffer memory 314.

Upon receiving a token from L2 cache 312, CROP 310 may begin processing the next tile by issuing a conditional read for the address of the next tile (e.g., based on the next tile descriptor from raster engine 304). Upon receiving compressed tile data from L2 cache 312, CROP 310 uncompresses the compressed tile data and writes the data (e.g., in-place) to frame buffer memory 314 (e.g., via L2 cache 312).

Figure 4:
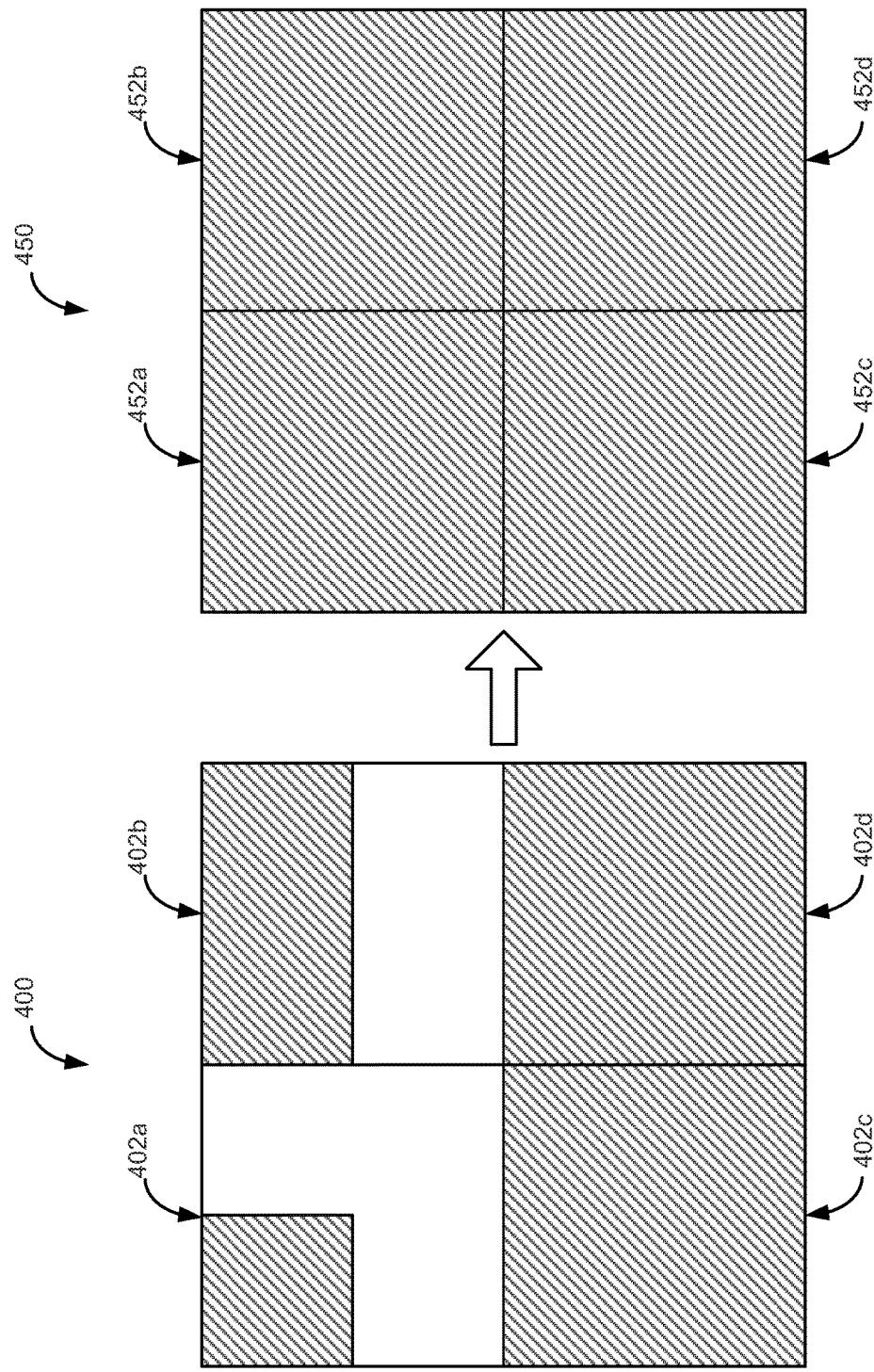
FIG. 4 shows a block diagram of exemplary tiles and their memory allocations before and after decompression in accordance with one embodiment of the present invention.

FIG. 4 shows a block diagram of exemplary tiles and their memory allocations before and after decompression in accordance with one embodiment of the present invention.

FIG. 4 depicts a first set of tiles 400 including compressed tiles which are uncompressed into a second set of uncompressed tiles 450.

First set of tiles 400 includes tiles 402a-d. In one embodiment, each tile whether compressed or uncompressed is allocated the same amount of memory space. In other words, a compressed tile will occupy a portion of the storage allocated for that tile. Each tile may be divided into eight parts or sectors and when a tile is uncompressed data is stored at each of the sectors. For example, a compressed tile may be stored in one of the eight sectors (e.g., seven of the allocated sectors are empty). Embodiments of the present invention are operable to read the compressed sectors of a tile and write uncompressed data to each sector of a tile.

Tiles 402a-b are compressed tiles and thus occupy less than the space allocated for an uncompressed copy of tiles 402a-b, respectively. Tiles 402c-d are uncompressed and occupy the full space allocated for each tile. Tiles 402a-b may have been opportunistically compressed (e.g., during rendering where tiles 402a-b are coherent and converge).

During a decompression process (e.g., process 500), the compressed tiles of the first set of tiles 400 are uncompressed to form second set of tiles 450. Second set of tiles 450 includes tiles 452a-d, each of which are uncompressed. The decompression process in accordance with an embodiment of the present invention is operable to read data from only compressed tiles (e.g., tiles 402a-b) and write the uncompressed copies of the data in the portion of memory allocated for the respective tiles (e.g., the memory allocated to tiles 402a-b is fully occupied when the tiles are uncompressed to tiles 452a-b, respectively). Embodiments of the present invention are operable for in-place decompression such that a tile is allocated space according to the uncompressed tile memory size and compressed data of the tile occupying less than the entire space allocated for the tile is uncompressed into the memory space allocated for the uncompressed tile.

Figure 5:
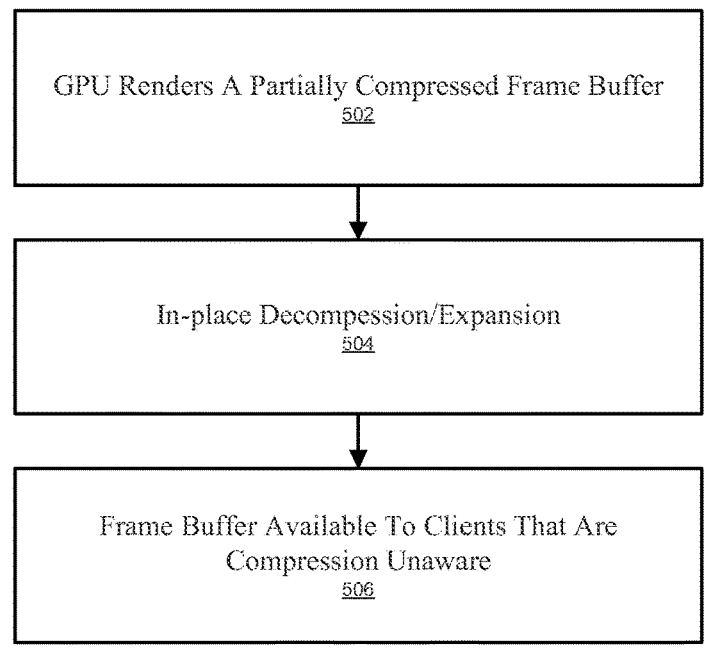
FIG. 5 shows a flowchart of an exemplary computer controlled process for rendering and decompressing frame buffer memory in accordance with one embodiment of the present invention.
Figure 6:
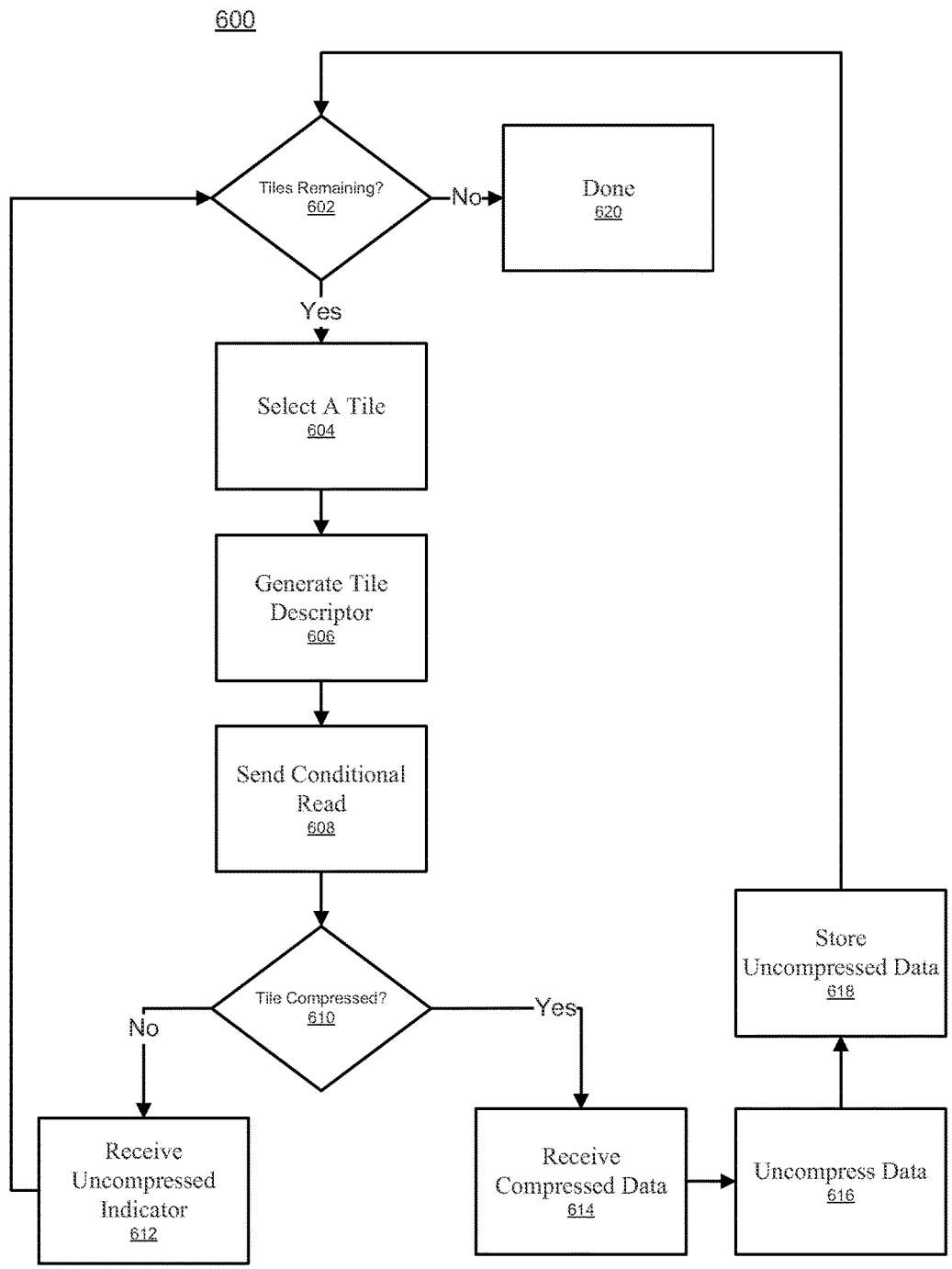
FIG. 6 shows a flowchart of an exemplary computer controlled process for decompressing frame buffer memory in accordance with one embodiment of the present invention.

With reference to FIGS. 5-6, flowcharts 500-600 illustrate example functions used by various embodiments of the present invention for in-place expansion/decompression. Although specific function blocks ("blocks") are disclosed in flowcharts 500-600, such steps are examples. That is, embodiments are well suited to performing various other blocks or variations of the blocks recited in flowcharts 500-600. It is appreciated that the blocks in flowcharts 500-600 may be performed in an order different than presented, and that not all of the blocks in flowcharts 500-600 may be performed.

FIG. 5 shows a flowchart of an exemplary computer controlled process for rendering and decompressing frame buffer memory in accordance with one embodiment of the present invention. FIG. 5 depicts a process for rendering graphics data (e.g., to a frame buffer) using compression and selectively decompressing compressed portions of the frame buffer memory thereby enabling access to the frame buffer by compression unaware clients.

At block 502, a GPU renders a partially compressed frame buffer as described herein (e.g., rendering a video frame, game scene, etc.). It is noted that the frame buffer may be opportunistically compressed (e.g., on a per tile basis based on pixel complexity). Embodiments of the present invention support a fully compressed and partially compressed frame buffers.

At block 504, in-place decompression/expansion is performed as described herein (e.g., process 600). The in-place decompression/expansion may be performed in conjunction with a clear mechanism and/or via conditional reads, as described herein.

At block 506, the frame buffer is available to clients that are compression unaware (e.g., unable to decompress data compressed by the GPU) as described herein. For example, a display which is operable to access the frame buffer (e.g., directly or indirectly) may be compression unaware and thereby display data from the frame buffer after the frame buffer is decompressed.

FIG. 6 shows a flowchart of an exemplary computer controlled process for decompressing frame buffer memory in accordance with one embodiment of the present invention. FIG. 6 depicts the process performed by embodiments of the present invention in decompressing compressed portions of a memory (e.g., frame buffer). It is noted that while process 600 is described with respect to tiles (e.g., square or rectangular portions of an image), embodiments of the present invention are operable to process an image in portions and sizes other than tiles (e.g., 1D arrays, 2D tiles, 3D volumes or bricks of data, and 4D arrays of moving volumes).

At block 602, whether any tiles remain to be processed is determined. In one embodiment, whether any tiles remain is based on a raster order scan of an image (e.g., in a frame buffer) by a raster engine of a GPU. If there are tiles remaining to be processed, block 604 is performed. If there are no tiles remaining to be processed, block 620 is performed.

At block 604, a tile is selected. A tile may be any portion of an image. In one embodiment, a portion of an image (e.g., a tile) to be selected from a memory is determined by a raster portion (e.g., raster portion 302). For example, the tile may be selected based on being the next tile in a raster scan order traversal of an image in a frame buffer.

At block 606, a tile descriptor is generated. In one embodiment, a tile descriptor corresponding to the portion of the image is generated by a raster engine and sent to a raster operation portion. A memory address corresponding to the tile descriptor may then be determined (e.g., by a raster operation portion). In one exemplary embodiment, a conditional read corresponding to the portion of the image or tile is sent based on the memory address (e.g., by a raster operation portion). The conditional read may be sent to a portion of a memory subsystem (e.g., cache or frame buffer).

At block 608, a conditional read is performed. The conditional read may be sent by a raster portion (e.g., raster portion 302) and received and performed by a portion of a frame buffer memory system (e.g., cache or frame buffer memory).

At block 610, whether the tile is compressed is determined. In one embodiment, whether the tile is compressed may be based on a data structure indicating which files are compressed (e.g., in a cache or frame buffer memory). If the tile is not compressed, block 612 is performed. If the tile is compressed, block 614 is performed.

At block 612, an uncompressed indicator is received. In one embodiment, in response to the conditional read, an indicator (e.g., a token) operable to indicate that the portion of the image (e.g., tile) is uncompressed is received (e.g., at a raster operation portion). Block 602 may then be performed.

At block 614, compressed data is received. In one embodiment, in response to the conditional read, compressed data is received if the portion of the image (e.g., tile) is compressed (e.g., at a raster operation portion).

At block 616, the data is uncompressed. In one embodiment, in response to receiving the compressed data, the compressed data is uncompressed into uncompressed data (e.g., at a raster operation portion).

At block 618, the uncompressed data is stored. In one embodiment, the uncompressed data is written to the memory corresponding to the portion of the image in a memory (e.g., in a frame buffer). In one exemplary embodiment, a frame buffer is operable for access by a component unable to process the compressed data (e.g., client 220-222).

At block 620, process 600 is done for a set of tiles (e.g., an image to be output to a display or screen). Process 600 may be performed for the next set of tiles of an image in a frame buffer (e.g., the next frame of video or display output).

In one embodiment, in-place compression can be applied to the frame buffer such that uncompressed tiles can be compressed (or recompressed). For example, after a compression unaware client (e.g., CPU, copy-engine, etc.) has accessed the uncompressed data in the frame buffer, more rendering may be performed. Rendering or texturing based on the uncompressed portion of the frame buffer may be performed and it would be desirable to recompress a portion of the frame buffer to achieve increased performance (e.g., reduced bandwidth usage, etc.). For example, in-place compression may be applied to textures uploaded from a CPU. Compression of simple textures (e.g., cartoon birds) might result in a reasonable amount of compression thereby reducing texture bandwidth usage during rendering. As another example, an application may render a surface to a frame buffer, perform a readback of the data in the frame buffer (and may write to parts of the surface), and then more drawing with a GPU. The recompressing of the surface after in-place decompression, as described herein, may result in better GPU performance during subsequent rendering with the recompressed data.

Figure 7:
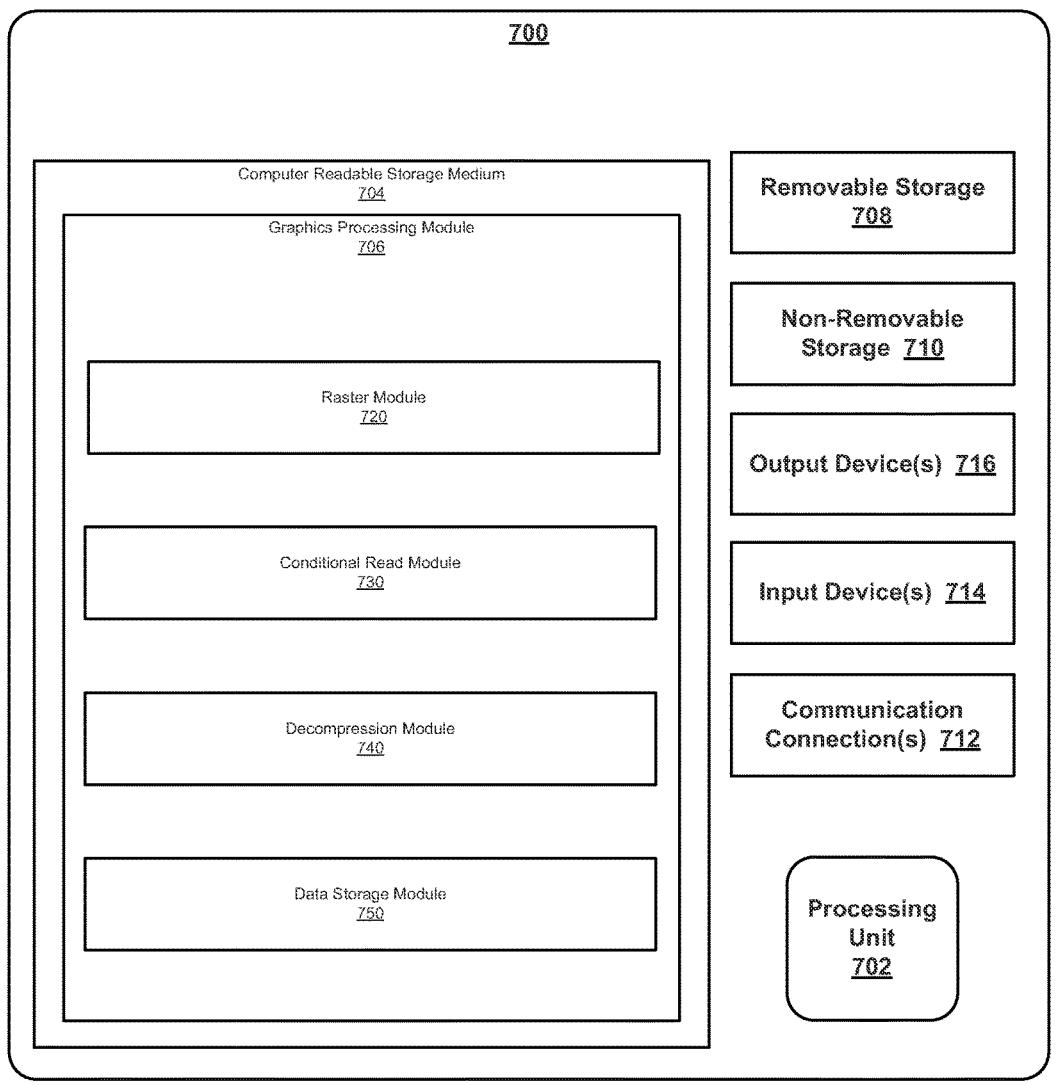
FIG. 7 shows a block diagram of exemplary computer system and corresponding modules, in accordance with one embodiment of the present invention.

FIG. 7 illustrates exemplary components used by various embodiments of the present invention. Although specific components are disclosed in computing system environment 700, it should be appreciated that such components are examples. That is, embodiments of the present invention are well suited to having various other components or variations of the components recited in computing system environment 700. It is appreciated that the components in computing system environment 700 may operate with other components than those presented, and that not all of the components of system 700 may be required to achieve the goals of computing system environment 700.

FIG. 7 shows a block diagram of exemplary computer system and corresponding modules, in accordance with one embodiment of the present invention. With reference to FIG. 7, an exemplary system module for implementing embodiments includes a general purpose computing system environment, such as computing system environment 700. Computing system environment 700 may include, but is not limited to, servers, desktop computers, laptops, tablet PCs, mobile devices, and smartphones. In its most basic configuration, computing system environment 700 typically includes at least one processing unit 702 and computer readable storage medium 704. Depending on the exact configuration and type of computing system environment, computer readable storage medium 704 may be volatile (such as RAM), non-volatile (such as ROM, flash memory, etc.) or some combination of the two. Portions of computer readable storage medium 704 when executed facilitate decompression (e.g., process 500).

Additionally, computing system environment 700 may also have additional features/functionality. For example, computing system environment 700 may also include additional storage (removable and/or non-removable) including, but not limited to, magnetic or optical disks or tape. Such additional storage is illustrated in FIG. 10 by removable storage 708 and non-removable storage 710. Computer storage media includes volatile and nonvolatile, removable and non-removable media implemented in any method or technology for storage of information such as computer readable instructions, data structures, program modules or other data. Computer readable medium 704, removable storage 708 and nonremovable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 700. Any such computer storage media may be part of computing system environment 700.

Computing system environment 700 may also contain communications connection(s) 712 that allow it to communicate with other devices. Communications connection(s) 712 is an example of communication media. Communication media typically embodies computer readable instructions, data structures, program modules or other data in a modulated data signal such as a carrier wave or other transport mechanism and includes any information delivery media. The term computer readable media as used herein includes both storage media and communication media.

Communications connection(s) 712 may allow computing system environment 700 to communication over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 712 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 700 may also have input device(s) 714 such as a keyboard, mouse, pen, voice input device, touch input device, remote control, etc. Output device(s) 716 such as a display, speakers, etc. may also be included. All these devices are well known in the art and are not discussed at length.

In one embodiment, computer readable storage medium 704 includes graphics processing module 706. Graphics processing module 706 includes raster module 720, conditional read module 730, decompression module 740, and data storage module 750.

In one embodiment, raster module 720 is operable to select a tile of a frame buffer to be accessed. For example, raster module 720 is operable to select a tile of a frame buffer based on traversing a portion of the frame buffer (e.g., 1D arrays, 2D tiles, 3D volumes or bricks of data, and 4D arrays of moving volumes based on a raster scan order traversal of an image). Raster module 720 is further operable to generate a tile descriptor (e.g., based on the selected tile). Raster module 720 may determine an address (e.g., memory address) of the frame buffer corresponding to the tile descriptor. Raster module 720 may then send a conditional read command to conditional read module 730. Raster scan module 720 may further be operable to access a sub-portion (e.g., sub-rectangle or sub-3D brick of data) of the frame buffer in raster scan order. Such sub-portion access is useful for cases where a compression unaware client needs to access a subset of the overall data or the data is sparse.

Conditional read module 730 is operable to determine whether the tile of the frame buffer comprises at least one of compressed data and uncompressed data. The conditional read module 730 is operable to return compressed data if the tile comprises compressed data and operable to return a token indicating that the tile is uncompressed if the tile comprises uncompressed data.

Decompression module 740 is operable to output uncompressed data corresponding to the compressed data. For example, decompression module 740 may decompress data that was compressed by a graphics processing unit (GPU) during rendering. Data storage module 750 is operable to write the uncompressed data to a portion of the frame buffer corresponding to the tile of the frame buffer. In one embodiment, decompression module 750 is operable to decompress the tile in an in-place manner.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of uncompressing data, said method comprising:
   determining a portion of an image to be read from a frame buffer memory wherein said frame buffer memory comprises compressed and uncompressed portions;
   initiating a conditional read corresponding to said portion of said image, wherein said conditional read initially returns a compressed or uncompressed status indicator concerning said portion based on a data structure comprising a plurality of status indicators for said compressed and uncompressed portions of said frame buffer memory;
   further performing said conditional read by reading compressed data if said portion of said image is indicated by said status indicator as compressed and decompressing said compressed data into decompressed data, otherwise skipping over reading said portion of said image if said portion of said image is indicated by said status indicator as uncompressed; and
   writing said uncompressed data to said frame buffer memory corresponding to said portion of said image and otherwise skipping over writing said portion of said image if said portion is indicated by said status indicator as uncompressed.

2. The method as described in claim 1 wherein said portion of said image comprises a three dimensional volume.

3. The method as described in claim 2 further comprising: determining a memory address corresponding to said portion of said image.

4. The method as described in claim 1 wherein said portion of said image comprises a tile of said frame buffer memory.

5. The method as described in claim 4 wherein said frame buffer memory is accessible by a compression unaware client device comprising components unable to process said compressed data.

6. The method as described in claim 1 further wherein said plurality of status indicators are memory resident and comprise a respective status indicator for each portion of said frame buffer memory.

7. The method as described in claim 1 wherein said conditional read is sent to a cache memory.

8. The method as described in claim 1 wherein said status indicator comprises a token.

9. A system for reading a frame buffer memory, said system comprising:
   a raster module operable to select a tile of said frame buffer memory to be read, wherein said frame buffer memory comprises compressed and uncompressed tiles;
   a conditional read module operable to determine whether said tile of said frame buffer comprises at least one of compressed data and uncompressed data based on a conditional read thereof, wherein said conditional read returns a compressed or uncompressed status indicator concerning said tile, wherein said conditional read module is operable to output compressed data associated with said tile if said tile is indicated as compressed, wherein said conditional read module is operable to skip over said tile if said tile is indicated as uncompressed;
   a decompression module operable to generate decompressed data corresponding to said compressed data associated with said tile; and
   a data storage module operable to write said decompressed data to said tile of said frame buffer memory, and otherwise to skip over writing said tile of said frame buffer if said tile of said frame buffer is indicated by said status indicator as uncompressed.

10. The system as described in claim 9 wherein said raster module is operable to select a sub-portion of the frame buffer memory in raster scan order.

11. The system as described in claim 9 wherein said raster module is operable to determine an address of said frame buffer memory corresponding to said tile.

12. The system as described in claim 9 wherein said compressed data was compressed by a graphics processing unit (GPU).

13. The system as described in claim 9 wherein said conditional read module is operable to output a token indicating that said tile is one of uncompressed and compressed.

14. The system as described in claim 9 wherein said raster module operable to select said tile of said frame buffer memory based on traversing said frame buffer memory.

15. A graphics processing system comprising:
   a frame buffer memory comprising compressed and uncompressed portions, wherein said compressed and uncompressed portions are operable for use in rendering;
   a raster module operable to read said frame buffer memory in raster scan order and wherein said raster module is operable to select a portion of said frame buffer memory to be read based on said raster scan order;

a conditional read module operable to determine whether said portion of said frame buffer memory is a compressed portion of an image based on a conditional read thereof, wherein said conditional read returns a compressed or uncompressed status indicator concerning said portion, wherein said conditional read module skips over said portion of said frame buffer memory if said portion of said frame buffer memory is indicated as uncompressed and outputs compressed data is said portion is indicated as compressed; and a decompression module operable to decompress said compressed data, wherein said decompression module is operable to facilitate said frame buffer memory being read by a compression unaware remote client by decompressing said compressed portions; and a data storage module operable to write said decompressed data to said portion of said frame buffer memory, and otherwise to skip over writing said portion of said frame buffer memory if said portion of said frame buffer memory is indicated by said status indicator as uncompressed.

16. The graphics processing system as described in claim 15 wherein said portion of said frame buffer memory comprises a tile.

17. The graphics processing system as described in claim 15 wherein said conditional read module is operable to return a token if said portion of said frame buffer memory comprises an uncompressed tile.

18. The graphics processing system as described in claim 15 wherein a cache comprises said conditional read module.

19. The graphics processing system as described in claim 15 wherein said portion of said frame buffer memory corresponds to a 3D volume.

20. The graphics processing system as described in claim 15 wherein said decompression module is operable to decompress said portion of said frame buffer memory in an in-place manner.

* * * * *